Oct. 30, 1945.  R. L. STRICKLAND ET AL  2,388,019
BEARING
Filed July 7, 1944
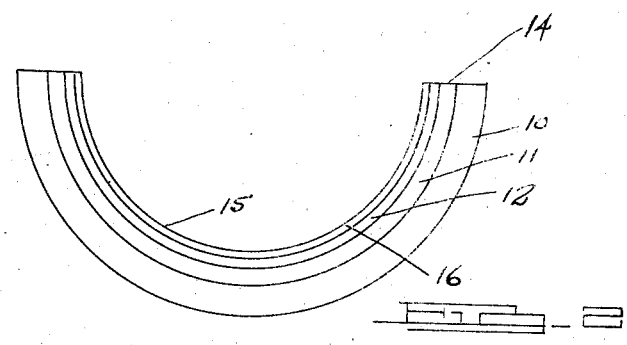
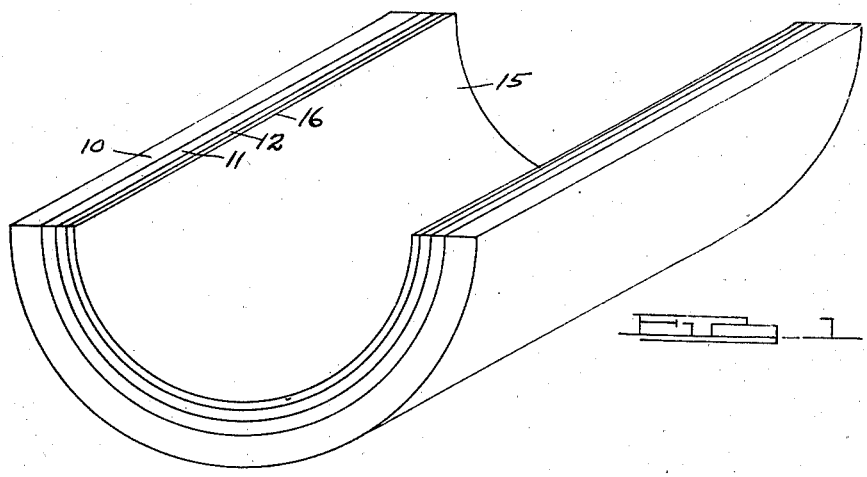
INVENTORS.
Randolph L. Strickland
BY Amelius B. Segale
Daniel G. Cullen. attorney.

Patented Oct. 30, 1945

2,388,019

UNITED STATES PATENT OFFICE 2,388,019

BEARING

Randolph L. Strickland, Rochester, and Amelius B. Segall, Detroit, Mich., assignors to Detroit Aluminum & Brass Corp., Detroit, Mich., a corporation of Michigan Application July 7, 1944, Serial No. 543,884

1 Claim. (Cl. 308—237)

This application relates to bearing combinations, such as those including a shaft member and a bearing.

A prior Patent No. 2,178,149, of October 31, 1939 shows a three layer bearing. This application discloses, as an improvement over the bearing of that patent, the addition of a thin, soft metal coating to the bearing layer.

For an understanding of the bearing herein disclosed, reference should be had to the appended drawing.

In this drawing:

Figure 1 shows one half of a cylindrical or sleeve type bearing of our invention.

Figure 2 shows two halves assembled.

The drawing shows one-half of a sleeve type bearing consisting of two halves, each comprising a backing 10, a liner 11, a bearing layer 12, and a coating 16. The halves meet on line 14 to define space 15 in which may rotate a shaft member, not shown. In the bearing shown, the backing is of steel, the liner is a soft alloy, such as a cadmium base babbitt, and the bearing layer is a hard metal, such as copper. The liner layer 11 is soft enough and thick enough to absorb particles found within the space between the shaft and the bearing. The bearing layer is thick enough to retard cracking of the liner and yet is thin enough to permit the particles to penetrate it and go into the particle absorbing layer 11.

Suitable dimensions are as follows: The backing layer is of low carbon steel, 2 inches in diameter and .037 inch thick. The liner layer is formed of any suitable alloy, one hundred fifty ten thousandths of an inch, (.015 inch) thick. The bearing layer is of pure copper, ranging from one half of a ten thousandth of an inch to ten ten thousandths of an inch (.00005–.0010 inch) thick.

The coating may be of any suitable soft metal or alloy, such as lead, lead indium, cadmium, tin, etc. It is minutely thin and while it may be as much as .001 inch thick, it preferably is as thin as possible. In one embodiment, the coating 16 was a flash plating with a thickness even less than .00001 inch.

The coating 16 functions as follows:

It will permit some thickening of the bearing layer 12. This layer is provided to prevent cracking of the soft liner. It is desirable to make the bearing layer somewhat thicker than as described in the said patent, to improve its protective or anti-cracking characteristic. It is not desirable to make the bearing layer too thick, that is so thick that it impairs the conformability of the bearing or impairs the power of particles to go through to the liner of the bearing. A soft coating 16 permits some thickening of the bearing layer without impairing its anti-cracking character.

The coating permits some reduction of the thickness of the liner layer, an advantage in reduction of cracking tendency.

The coating 16 also functions to attract particles and arrest their rotation temporarily. While they are stopped momentarily, they can be pushed towards and into the liner layer with greater facility than when they are rotating around the shaft. This action of the coating is manifested by a reduction in the scraping or scoring of shafts or bearings due to the rotating of particles.

The coating 16 also functions to increase the degree of spot or local conformability of the bearings. Thickening of the bearing layer ordinarily impairs the spot or local conformability. However, the soft coating provides the same spot or local conformability for a somewhat thicker bearing layer bearing than would be present if the same bearing had a thinner bearing layer but did not have the soft coating 16. The spot or local conformability of a bearing having a thicker bearing layer and a soft coating 16 may be equal to that of a bearing having a thinner bearing layer but without the soft coating 16.

Now having described the bearing herein disclosed, reference should be had to the claim which follows.

We claim:

A bearing consisting of integrally united layers, the outer one of which is a supporting layer of hard metal, the next adjacent one of which is an intermediate layer of a soft readily conformable particle absorbing metal having a thickness of .015" approximately, and the next adjacent one of which is in the form of a very thin hard coating or skin having a thickness above .00005" but less than .0010" which prevents cracking of the intermediate layer and which is hard enough to resist cracking and which is thin enough to permit particles to be absorbed by the intermediate layer, and the innermost one which is a thin, soft locally conformable metal coating for holding particles and arresting their movement around the bearing.

RANDOLPH L. STRICKLAND.
AMELIUS B. SEGALL.